United States Patent [19]

Lam

[11] Patent Number: 5,164,073
[45] Date of Patent: Nov. 17, 1992

[54] CATALYTIC CRACKING CATALYST CONTAINING DIATOMACEOUS EARTH

[75] Inventor: Chiu T. Lam, Houston, Tex.

[73] Assignee: Akzo N.V., Arnhem, Netherlands

[21] Appl. No.: 595,160

[22] Filed: Oct. 10, 1990

Related U.S. Application Data

[63] Continuation-in-part of Ser. No. 337,772, Apr. 13, 1989, abandoned.

[51] Int. Cl.$^5$ .................. B01J 29/06; C10G 11/05
[52] U.S. Cl. .................................. 208/120; 502/64; 502/65; 502/68
[58] Field of Search .............. 502/64, 65, 68; 208/118, 120

[56] References Cited

U.S. PATENT DOCUMENTS

| | | | |
|---|---|---|---|
| 1,840,450 | 1/1932 | Jaeger et al. | 208/120 |
| 2,369,001 | 2/1945 | Ahlberg et al. | 208/120 |
| 3,312,615 | 4/1967 | Cramer et al. | 208/120 |
| 3,436,357 | 4/1969 | Plank et al. | 502/68 |
| 4,581,340 | 4/1986 | Himpsl et al. | 502/68 |

FOREIGN PATENT DOCUMENTS 219174 4/1987 European Pat. Off. ............ 208/120

Primary Examiner—Carl F. Dees
Attorney, Agent, or Firm—James K. Poole; Louis A. Morris

[57] ABSTRACT

A catalytic composite and its use in the fluidized catalytic cracking of hydrocarbons in the absence of added hydrogen. The composite comprises a binder material, a crystalline aluminosilicate, preferably a Y-type zeolite, and diatomaceous earth. Optional ingredients are kaolin, barium titanate and discrete particles of porous alumina. Absent from the composite is a supported catalytically active metal or metal oxide. The catalytic composite of the invention achieves higher gasoline production with lower coke production as compared to FCC catalysts with no diatomaceous earth content.

23 Claims, 3 Drawing Sheets

FIG.1

MERCURY PORE SIZE DISTRIBUTION

FIG.2

THERMAL STABILITY OF D.E. SAMPLES

FIG.3

CATALYTIC CRACKING CATALYST CONTAINING DIATOMACEOUS EARTH

CROSS REFERENCE TO RELATED APPLICATION

This application is a continuation-in-part of my prior copending application Ser. No. 07/337,772, filed Apr, 13, 1989 and now abandoned, incorporated herein by reference.

BACKGROUND OF THE INVENTION

The field of art to which the claimed invention pertains is catalytic composites as well as the manufacture and use thereof. More specifically, the claimed invention relates to use of a catalytic composite comprising diatomaceous earth dispersed in a refractory metal oxide binder material There are a number of continuous cyclical processes employing fluidized solid techniques in which carbonaceous materials are deposited on the solids in the reaction zone and the solids are conveyed during the course of the cycle to another zone where carbon deposits are at least partially removed by combustion in an oxygen-containing medium. The solids from the latter zone are subsequently withdrawn and reintroduced in whole or in part to the reaction zone.

One of the more important processes of this nature is the fluid catalytic cracking (FCC) process in which heavy petroleum hydrocarbon feed stocks boiling in excess of about 400° F. are converted to lower boiling hydrocarbons in the motor fuel boiling range by heating them in contact with an amorphous silica-alumina catalyst maintained in a fluidized state. The FCC process does not employ added hydrogen. While other composites comprising silica, e.g. silica-zirconia, silica-magnesia, etc., have been known to catalyze the cracking reaction, the silica-alumina composite has been by far the most widely accepted catalyst in the industry. More recently, improved catalysts having the capability of yielding greater proportions of high octane gasoline have been prepared by the inclusion of a finely divided zeolite, or crystalline aluminosilicate, either naturally occurring or synthetically prepared, within the amorphous silica-alumina matrix. Prior inventors have prepared, tested and compared hydrocarbon conversion catalysts comprising a finely divided crystalline aluminosilicate distributed in an amorphous silica matrix on the one hand, and in an amorphous silica-alumina matrix on the other hand.

The FCC reaction produces, in addition to the desirable products, such as high octane gasoline, a quantity of undesirable products such as the carbonaceous material or coke that deposits on the catalyst. The above mentioned zeolite containing catalysts enable minimization of these undesirable products while maximizing the conversion to the desirable products. Continuous efforts are being made, however, to improve the performance of even the zeolite containing catalysts.

There are many zeolite containing FCC catalysts described in the art other than those mentioned above which achieve improved performance by the addition of certain ingredients either to the catalyst itself or to the materials used in the manufacture of the catalyst at one or more of the manufacturing states. U.S. Pat. No. 4,259,212 to Gladrow et al. is an example of one such reference. None of such zeolite containing FCC catalysts, however, contains diatomaceous earth.

U.S. Pat. No. 4,233,139 to Murrell et al. does teach a hydrocarbon conversion catalyst which may contain kieselguhr (includes diatomaceous earth), but does not teach zeolite content in the catalyst and does require a supported catalytically active metal oxide comprising or mixed with an oxide of tungsten or niobium.

There are numerous teachings in the art of catalytic compositions which might contain both zeolite and diatomaceous earth, but which also contain supported catalytic metal oxides and which are for hydrogenation processes and not suitable for the fluidized catalytic cracking of hydrocarbons in the absence of hydrogen. Examples of such art are U.S. Pat. Nos. 4,218,308; 4,497,907; and European Patent Application 0 097 047.

U.S. Pat. No. 4,218,308 to Itoh et al. also requires supported catalytic metal oxides and relates only to a hydrogenation catalyst not suitable for the fluidized catalytic cracking of hydrocarbons in the absence of hydrogen.

U.S. Pat. No. 3,257,311 to Frilette et al. mentions a catalyst for the selective conversion of hydrocarbons with an aluminosilicate catalyst which might have a diatomaceous earth matrix, although it is preferred to use the aluminosilicate catalyst per se (see column 3). There is no teaching in Frilette et al. that the diatomaceous earth might actually enhance catalyst performance or improve the properties of the catalyst. There is no teaching in Frilette et al. of specific criteria for diatomaceous earth concentrations or particle size which I have found to effect surprisingly advantageous results.

U.S. Pat. No. 2,394,710 to McAfee mentions using diatomaceous earth as a "relatively inert contact material" in thermal hydrocarbon conversion processes and is clearly not even of superficial relevance to my invention.

In the *Encyclopedia of Chemical Technology*, Kirk-Othmer, Third Edition, Volume 7, it is mentioned that special grades of diatomite are used as a carrier for catalysts in petroleum refining.

I have discovered that diatomaceous earth incorporated into a molecular sieve type fluidized catalytic cracking process enables higher production of gasoline while minimizing the production of undesirable coke.

SUMMARY OF THE INVENTION

It is, accordingly, a broad objective of my invention to provide a novel catalytic composite and process for cracking a hydrocarbon charge stock.

In brief summary, my invention is, in one embodiment, a catalytic composite suitable for the fluidized catalytic cracking of hydrocarbons in the absence of added hydrogen. The composite comprises particles containing a binder material comprising at least one inorganic refractory metal oxide selected from the group consisting of alumina. silica, zirconia, boria, magnesia, titania and chromia, as well as a crystalline aluminosilicate and diatomaceous earth. The composite does not include a supported catalytically active metal or metal oxide which would include the free metal or oxide of tungsten, niobium, noble metal, or other Group VIII metal. A catalytically active metal or metal oxide would not be considered supported if it was dispersed throughout the composite or was part of the crystalline structure of an aluminosilicate.

In a second embodiment, my invention is a process for cracking a hydrocarbon charge stock which comprises contacting the charge stock at cracking conditions with the above described catalytic composite.

Other objectives and embodiments of my invention encompass details about composite ingredients, steps in the manufacture and chemicals and conditions used in such manufacture, all of which are hereinafter disclosed in the following discussion of each of the facets of my invention.

DESCRIPTION OF THE INVENTION

The catalyst composite of the present invention is intended to be used in a process for cracking a hydrocarbon charge stock at cracking conditions. The most common form of such a process is well known to the art as the fluid catalytic cracking process and is described in detail in numerous publications, such as U.S. Pat. Nos. 2,409,353; 3,692,864; and 2,698,281; to name just a few of the most basic of these publications.

In a typical FCC process flow, finely divided regenerated catalyst leaves the regeneration zone at a certain temperature and contacts a feedstock in a lower portion of a reaction riser zone. While the resulting mixture, which has a temperature of from about 600° to about 1000° F., passes up through the riser, conversion of the feed to lighter products and to coke deposited on the catalyst occurs. The effluent from the riser is discharged into a disengaging space where additional conversion can take place. The hydrocarbon vapors, containing entrained catalyst, are then passed through one or more cyclone separation means to separate any spent catalyst from the hydrocarbon vapor stream. The separated hydrocarbon vapor stream is passed into a fractionation zone, known in the art as the main column, wherein the hydrocarbon effluent is separated into such typical fractions as light gases and gasoline, light cycle oil, heavy cycle oil and slurry oil. Various fractions from the main column can be recycled along with the feedstock to the reaction riser. Typically, fractions such as light gases and gasoline are further separated and processed in a gas concentration process located downstream of the main column. Some of the fractions from the main column, as well as those recovered from the gas concentration process may be recovered as final product streams. The separated spent catalyst passes into the lower portion of the disengaging space and eventually leaves that zone passing through stripping means in which a stripping gas, usually steam, countercurrently contacts the spent catalyst purging adsorbed and interstitial hydrocarbons from the catalyst. The spent catalyst containing coke leaves the stripping zone and passes into a regeneration zone, where, in the presence of fresh regeneration gas and at a temperature of from about 1150° to about 1400° F., combustion of coke produces regenerated catalyst having a carbon content of from about 0.01 to about 0.5 wt % and flue gas containing carbon monoxide, carbon dioxide, water, nitrogen and perhaps a small quantity of oxygen. Usually, the fresh regeneration gas is air, but it could be air either enriched or deficient in oxygen. Flue gas is separated from entrained regenerated catalyst by cyclone separation means located within the regeneration zone and separated flue gas is passed from the regeneration zone, typically, to a carbon monoxide boiler where the chemical heat of carbon monoxide is recovered by combustion as a fuel for the production of steam. Regenerated catalyst which was separated from the flue gas is returned to the lower portion of the regeneration zone which is maintained as a dense bed of spent catalyst. Regenerated catalyst leaves this dense bed and, as previously mentioned, contacts the feedstock in a reaction zone.

The FCC catalysts contemplated for use by this invention are the aluminosilicate or zeolite-containing catalysts. The aluminosilicate or zeolite will be dispersed in an amorphous porous inorganic oxide matrix.

Zeolitic crystalline aluminosilicates occur both naturally or are synthesized. In hydrated form, the crystalline aluminosilicates generally encompass those zeolites represented by the Formula 1 below:

Formula 1

$M_{2/n}O:Al_2O_3:wSiO_2:yH_2O$ where "M" is a cation which balances the electrovalence of the aluminum-centered tetrahedra and which is generally referred to as an exchangeable cationic site, "n" represents the valence of the cation, "w" represents the moles of $SiO_2$, and "y" represents the moles of water. The generalized cation "M" may be monovalent, divalent or trivalent or mixtures thereof.

Crystalline aluminosilicates particularly useful comprise zeolites in either the X or Y form. The X zeolite in the hydrated or partially hydrated form can be represented in terms of mole oxides as shown in Formula 2 below:

Formula 2

$(0.9\pm0.2)M_{2/n}O:Al_2O_3:(2.50\pm0.5)SiO_2:yH_2O$ where "M" represents at least one cation having a valence of not more than 3, "n" represents the valence of "M", and "y" is a value up to about 9 depending upon the identify of "M" and the degree of hydration of the crystal. As noted from Formula 2 the $SiO_2/Al_2O_3$ mole ratio of X zeolite is 2.5±0.5. The cation "M" may be one or more of a number of cations such as a hydrogen cation, an alkali metal cation, or an alkaline earth cation, or other selected cations, and is generally referred to as an exchangeable cationic site. As the X zeolite is initially prepared, the cation "M" is usually predominately sodium, that is, the major cation at the exchangeable cationic sites is sodium, and the zeolite is therefore referred to as a sodium-X zeolite. Depending upon the purity of the reactants used to make the zeolite, other cations mentioned above may be present, however, as impurities. The Y zeolite in the hydrated or partially hydrated form can be similarly represented in terms of mole oxides as in Formula 3 below:

Formula 3

$(0.9\pm0.2)M_{2/n}O:Al_2O_3:wSiO_2:yH_2O$ where "M" is at least one cation having a valence not more than 3, "n" represents the valence of "M", "w" is a value greater than about 3 up to about 6, and "y" is a value up to about 9 depending upon the identify of "M"

and the degree of hydration of the crystal. The SiO$_2$/Al$_2$O$_3$ mole ratio for Y zeolites can thus be from about 3 to about 6. Like the X zeolite, the cation "M" may be one or more of a variety of cations but, as the Y zeolite is initially prepared, the cation "M" is also usually predominately sodium. A Y zeolite containing predominately sodium cations at the exchangeable cationic sites is therefore referred to as a sodium-Y zeolite.

Cations occupying the exchangeable cationic sites in the zeolite may be replaced with other cations by ion exchange methods well known to those having ordinary skill in the field of crystalline aluminosilicates. Such methods are generally performed by contacting the zeolite or a base metal containing the zeolite with an aqueous solution of the soluble salt of the cation or cations desired to be placed upon the zeolite. After the desired degree of exchange takes place the sieves are removed from the aqueous solution, washed and dried to a desired water content. By such methods the sodium cations and any non-sodium cations which might be occupying exchangeable sites as impurities in a sodium-X or sodium-Y zeolite can be partially or essentially completely replaced with other cations.

The preferred zeolite for use in the catalytic composite of the present invention is a sodium-Y zeolite with cations occupying the exchangeable cationic sites in the zeolite being essentially completely exchanged with ammonium and rare earth metal cations. It is particularly preferred that the Y zeolite be treated with steam so that its unit cell size is reduced to from about 24.25 to 24.55 angstroms. Such zeolite is known as ultrastable Y zeolite (USY). The zeolite should comprise from about 20 to about 40 wt % of the composite.

Diatomaceous earth is an essential ingredient of the catalytic composite of the present invention, not as a carrier or catalyst support, but as an essential part of the catalyst and having a direct effect on its catalytic properties. Diatomaceous earth comes from diatomite which is a chalky, sedimentary rock composed of the skeletal remains of single cell aquatic plants called diatoms. The diatoms are food for minute marine animal life and are literally regarded as "grass of the sea". A complete diatom consists of the living cell itself, encased in and protected by two half cell walls. The cell walls are composed of opaline silica with porous structure. Two types of diatomaceous earth are being mined, a salt water and a fresh water variety. While the salt water deposit has a variety of different species with many distinct shapes, the fresh water one has only a cylindrical rod form. Salt water type diatomaceous earth may be obtained from the Johns Manville Company (Grade FC) and fresh water type from the Eagle-Picher Company (Celetom MN-4). The properties and composition of the latter two types of diatomaceous earth are set forth in the following Table 1.

TABLE 1

| Analysis of Diatomaceous Earth | | |
|---|---|---|
| Grade | Celite FC | MN-4 |
| Supplier | John Manville | Eagle Picher |
| LOI % wb | 7.4 | 5.3 |
| Na$_2$O % db | 0.07 | 0.12 |
| Al$_2$O$_3$ % db | 4.9 | 2.9 |
| SiO$_2$ % db | 89.1 | 93.9 |
| Fe$_2$O$_3$ % db | 1.53 | 0.78 |
| CaO % db | 0.45 | 0.45 |
| Quartz % db | ±2 | not detectable |
| PSD | (Coulter Counter) | (Coulter Counter) |

TABLE 1-continued

| Analysis of Diatomaceous Earth | | |
|---|---|---|
| −20/μm % | 93 | 100 |
| −15/μm % | 84 | 99.5 |
| −10/μm % | 63 | 91 |
| −5/μm % | 26 | 50 |
| −3/μm % | 8 | 22 |
| −2/μm % | 1 | 4 |
| d$_{50}$/μm | 7.9 | 5.0 |
| SA (Area meter) m$^2$/g | 7 | 8 |
| PV (ml/g) | 1.33 | 1.03 |
| ABD (g/ml) | 0.09 | 0.12 |

Because of the low density and high porosity of diatomaceous earth, its incorporation into a catalytic composite tends to lower the apparent bulk density (ABD) of the composite and enlarge the pore volume (PV) of the composite. It is preferred to mill the diatomaceous earth to a particle size of from about 2 to about 5 microns, since such milling will increase the ABD of the composite by about 10% while reducing the PV only slightly. Increased ABD enhances the physical strength of the composite while improving its flow and circulation behavior during FCC operation. Pore volume and pore size determinations as discussed herein were by the mercury porosimetry (BET) method. The term "particle size" as it pertains to any particle discussed herein, refers to the largest linear dimension of the particle in question. The following Table 2 shows the effect of milled and unmilled diatomaceous earth in a catalytic composite:

TABLE 2

| | The Influence of D.E. | |
|---|---|---|
| D.E. % | unmilled | milled |
| | ABD (g/ml) | ABD (g/ml) |
| 0 | 0.77–0.81 | |
| 10 | 0.54–0.58 | 0.60–0.70* |
| 25 | 0.42–0.50 | 0.48–0.54 |
| 50 | 0.34 | 0.56 |
| | PV (ml/g) | PV (ml/g) |
| 0 | 0.28–0.31 | — |
| 10 | 0.38 | 0.34–0.37 |
| 25 | 0.49, 0.47 | 0.36 |
| 50 | 0.52 | 0.54 |

*measured after calcining at 600° C., one hour.

From the above table it can be seen that the ABD decreases from 0.77 to 0.34 and the PV increases from 0.28 to 0.52 when the diatomaceous earth content increases from 0 to 50%. Catalysts with 25% or more diatomaceous earth have too low ABD and too high PV and not suitable for FCC operation. Only catalysts with from about 5 to about 15 wt % diatomaceous earth exhibit optimum ABD after calcining and good physical strength, with Davidson Attrition Index (standard commercial method) less than 7. The commercial maximum acceptable value for attrition index is from 10 to 15, so 7 would be considered excellent.

Figure 1:
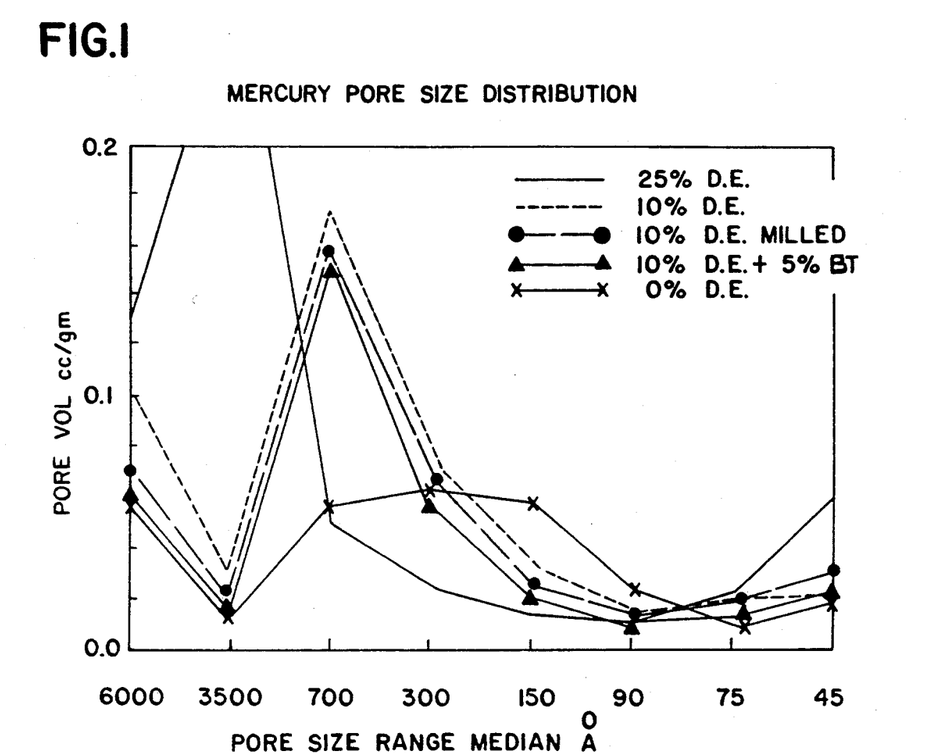
FIG. 1 provides illustration for the discussion hereinbelow of the effect of diatomaceous earth on pore volume and size distribution.

The incorporation of diatomaceous earth into a catalytic composite I have found will also affect its pore size distribution as shown in FIG. 1. When the diatomaceous earth content is about 10 wt %, I have found the majority of the pores are from 350 to 1,500A in diameter. When 25 wt % diatomaceous earth is used the pores from 700 to 6,000A in diameter will be increased substantially. The latter pore size distribution creates "craters" on the surface of the composite, which leads to a physically weak catalyst. Milling the 10% diatomaceous earth (from about 2 to about 5 microns) before embedding it in the composite, I have further found, will reduce the percentage of pores of about 3,500Å, and substantially reduce the 6,000 Å +pores. As will be vividly illustrated by the following examples, the use of diatomaceous earth achieves marked improvement in the performance of the FCC catalyst.

FCC catalyst is made by techniques wherein a solution of the binder precursor, such as a solution of one or more soluble salts of aluminum, silicon, zirconium, barium, magnesium, titanium, or chromium are comingled in an acid solution (pH at less than 2.5) with the various other ingredients (including zeolite and diatomaceous earth) of the catalyst and spray dried to obtain a dry powder product. The binder will usually comprise from about 10 to about 30 wt % of the composite. In principle, the spray dryer works by pumping the solution or slurry to be dried under high pressure to a pressure jet spray nozzle, or under mild pressure to an atomizer with variable rpm (revolutions per minute) to create fine droplets in which it is mixed with hot air (about 540° C.) under conditions of high turbulence and sprayed into a chamber. Alternatively, the solution or slurry may be pumped under mild pressure to an atomizer having variable speed capability to create fine droplets which are sprayed into the chamber with the hot air. In the chamber the liquid is evaporated from the solution or slurry and the dried solids particles are collected. The dried solids are preferably washed in a washing solution, such as an aqueous ammonium sulfate and ammonia, to remove extraneous materials which tend to clog the pores of the dried solids following spray drying. It is the nature of these solids to be very porous and to have a high effective surface area, thus enhancing their catalytic effect.

Kaolin ($Al_2O_3 \cdot 2H_2O \cdot O \cdot 2SiO_2$) is usually added to the above binder precursor to function as a filler material and impart bulk to the finished composite. The typical amount of kaolin used is from about 20 to about 30 wt %.

Some of the kaolin may be replaced by an equal amount of barium titanate ($BaTiO_3$), a high density material, which will impart a higher ABD to the catalyst without lowering the PV and without shifting the pore size distribution. The amount of barium titanate used may range from 0% to about 10 wt %, with about 5 wt % being preferred. That will facilitate a finished composite ABD of from about 0.65 to about 0.80 which is preferred so as to obtain desirable FCC flow characteristics. Barium titanate also serves to passivate metallic contaminants in the FCC chargestock such as nickel and vanadium.

Discrete particles of porous alumina may also be added to the binder solution in an amount of about 0 to about 20 wt %. The porous alumina tends to enhance the activity of the catalyst with regard to cracking the heavy ends of the chargestock. The average particle size of the alumina should be from about 2 to about 5 microns in diameter. The preferred alumina will be "bulk" alumina, which refers to a material preformed so that its surface area (greater than 20 m/g) and pore structure (greater than 0.33 cc/g) are stabilized so as to remain unchanged when added to the binder sol.

The catalytic composite may also contain from 0 to about 3 wt % (based on the oxide) rare earth metal. Rare earth metals are known to impart high thermal stability and catalytic activity to FCC catalysts. The preferred means of adding the rare earth to the catalyst is known as the "conventional procedure" and involves ion exchanging from about 80 to 90% of the sodium ions in the zeolite with rare earth ions before adding the zeolite to the sol mixture. The zeolite may be first ion exchanged with ammonium ions (from a solution of ammonium sulfate) twice and then the rare earth ions (from a solution of lanthanum oxide (60%), neodymium oxide (20%), cerium oxide (10%), praseodymium oxide (8%) and various other oxides for the remainder).

The following examples are presented to illustrate the method of manufacture of the catalytic composite of the present invention as well as its subsequent use in a fluid catalytic cracking process and are not intended to unduly restrict the scope and spirit of the claims attached hereto.

EXAMPLE 1

In the manufacture of the catalyst composite of the present invention, slurry gel sols were prepared as follows:

I. Binder precursor solutions were prepared by mixing water, sulfuric acid (50%) and waterglass (13.83% $SiO_2$ + 4.2% $Na_2O$).

II. The mixtures of I were chilled to 15°–20° C.

III. Milled USY zeolite (about 34% solid) and milled alumina slurries (16.3% solid, when used) were separately mixed to a pH of about 3.0 to 3.2.

IV. Diatomaceous earth slurries (18% solid) or powder were added to the mixtures of II.

V. Kaolin powder (when used) and barium titanate (when used) were added to the slurries of IV.

VI. The zeolite and alumina slurries of III were added to the slurries of V.

VII. The above mixtures and slurries were all well stirred in the course of preparation and the temperature of the final mixtures of VI maintained at a temperature under 20° C. and pH less than 4.0.

VIII. The mixtures of VI were spray dried into crude catalyst having average particle sizes from about 60 to about 75 microns.

IX. The crude catalysts of VIII were washed to reduce the sodium sulfate or oxide content to about 0.2–4 wt % based on $Na_2O$ and the wet catalyst dried to a moisture content less than 10 wt %.

The following Table 3 sets forth sixteen catalyst formations of varying compositions prepared via the above method:

TABLE 3

| | Formulation | | | | | | | | | |
|---|---|---|---|---|---|---|---|---|---|---|
| | 1 | 2 | 3 | 4 | 5 | 6 | 7 | 8 | 9 | 10 |
| Binder | 20 | 20 | 20 | 20 | 20 | 20 | 20 | 20 | 20 | 20 |
| Zeolite (USY) | 30 | 30 | 30 | 30 | 30 | 30 | 30 | 30 | 30 | 30 |
| Kaolin | 50 | 40 | 40 | 25 | 25 | — | 50 | 40 | 25 | — |
| D.E. | — | 10* | 10 | 25* | 25 | 50* | — | 10 | 25 | 50 |
| Analysis of fresh catalysts | | | | | | | | | | |
| S.A. | 211 | 216 | 200 | 225 | 198 | 208 | 204 | 207 | 203 | 227 |
| PV | 0.28 | 0.41 | 0.43 | 0.36 | 0.49 | 0.54 | 0.31 | 0.38 | 0.47 | 0.52 |
| ABD | 0.72 | 0.60 | 0.55 | 0.48 | 0.42 | 0.56 | 0.81 | 0.58 | 0.50 | 0.34 |

TABLE 3-continued

| | | | | | | | | | | |
|---|---|---|---|---|---|---|---|---|---|---|
| XRD | 30.60 | 27.70 | 27.00 | 31.00 | 27.90 | 27.10 | | | | |
| $SiO_2$ | 67.86 | 72.18 | 71.77 | 80.18 | 81.93 | 86.85 | 66.97 | 69.48 | 71.43 | 76.15 |
| $Al_2O_3$ | 30.19 | 26.66 | 27.02 | 19.47 | 18.51 | 10.91 | 30.26 | 25.26 | 20.38 | 10.38 |
| $TiO_2$ | 1.40 | 1.20 | 1.24 | 0.71 | 0.64 | 0.16 | 1.45 | 1.15 | 0.84 | 0.18 |
| $Re_2O_3$ | | | | | | | 1.30 | 1.30 | 1.13 | 1.24 |
| $Na_2O$ | 0.28 | 0.41 | 0.38 | 0.51 | 0.42 | 0.67 | 0.36 | 0.40 | 0.42 | 0.52 |
| $SO_4^=$ | 0.16 | 0.26 | 0.29 | 0.37 | 0.54 | 0.42 | 0.19 | 0.24 | 0.18 | 0.36 |

| | Formulation | | | | | |
|---|---|---|---|---|---|---|
| | 11 | 12 | 13 | 14 | 15 | 16 |
| Binder | 20 | 20 | 20 | 20 | 20 | 20 |
| Zeolite (USY) | 30 | 30 | 30 | 30 | 30 | 30 |
| Kaolin | 50 | 25 | 50 | 50 | 40 | 35 |
| D.E. | — | 25 | — | — | 10* | 10EP |
| Barium titanate (BT) | — | — | — | — | — | 5 |

| Analysis | fresh | steamed | fresh | steamed | fresh | stmd | fresh | stmd | fresh | stmd | fresh | stmd |
|---|---|---|---|---|---|---|---|---|---|---|---|---|
| S.A. | | 134 | | 124 | | 133 | 191 | 133 | 198 | 137 | 189 | 122 |
| PV | 0.29 | 0.25 | 0.47 | 0.42 | 0.31 | 0.32 | 0.29 | 0.35 | 0.34 | 0.37 | 0.37 | 0.36 |
| ABD | 0.72 | 0.78 | 0.48 | 0.50 | 0.77 | 0.83 | 0.77 | 0.65 | 0.70 | 0.70 | 0.70 | 0.78 |
| UCS | 24.56 | 24.32 | 24.55 | 24.28 | 24.25 | 24.51 | 24.19 | 24.52 | 24.25 | 24.42 | 24.25 | |
| XRD | 29.30 | 28.06 | 28.70 | 24.90 | 26.70 | 28.90 | 30.70 | 27.30 | 27.80 | 25.50 | 25.60 | |
| A.I. | | | | | | | | | 6.34 | | | 6.72 |
| $SiO_2$ | 68.16 | 68.74 | 74.69 | 75.93 | 64.17 | 67.12 | 66.79 | 68.76 | 69.40 | 70.11 | 72.97 | |
| $Al_2O_3$ | 29.70 | 30.42 | 18.63 | 20.25 | 34.35 | 30.23 | 30.61 | 26.70 | 26.99 | 23.53 | 24.72 | |
| $TiO_2$ | 1.35 | 1.34 | 0.71 | 0.76 | 1.45 | 1.53 | 1.58 | 1.21 | 1.21 | 3.82 | 3.88 | |
| $Re_2O_3$ | 0.63 | 0.71 | 0.64 | 0.67 | | | | | | | | |
| $Na_2O$ | 0.39 | 0.47 | 0.66 | 0.56 | 0.33 | 0.21 | 0.42 | 0.36 | 0.41 | 0.31 | 0.31 | |
| $SO_4^=$ | | | | | 0.09 | 0.11 | 0.07 | 0.14 | — | 0.12 | 0.03 | |

* = milled D.E.
EP = D.E. from Eagle-Picher
XRD = crystallinity content
UCS = unit cell size of zeolite (angstroms)

Analysis of formulations 11 through 16 includes the steamed compositions (steam at 795° C. for six hours), since these formulations were to be tested in a circulating pilot unit (CPU) which simulates a commercial unit where the practice is to steam the fresh catalyst so as to lower its initial activity.

EXAMPLE 2

Figure 2:
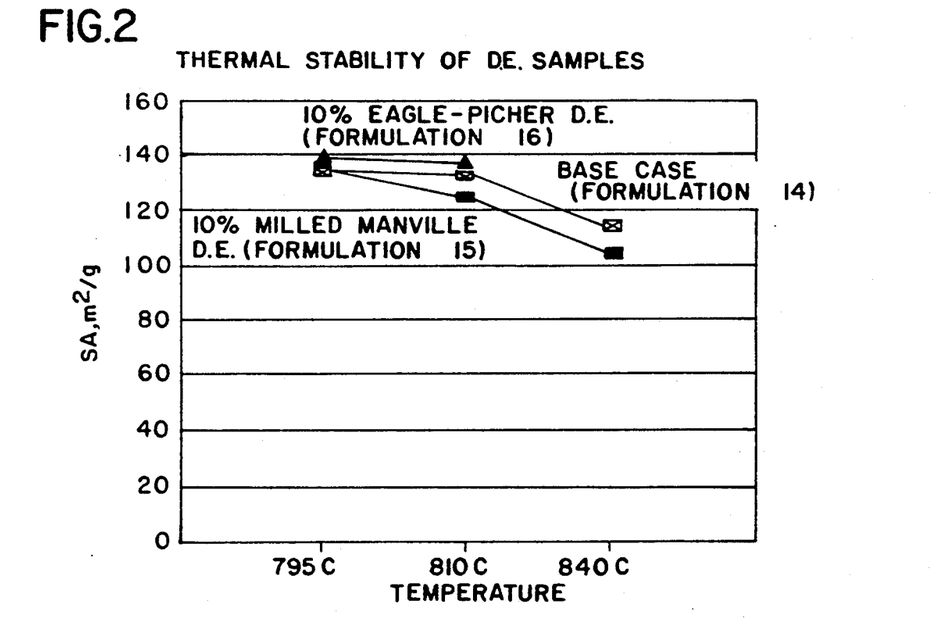
FIGS. 2 through 4 serve to present experimental results associated with the various following examples.

Portions of the above formulations 16 (diatomaceous earth from Eagle-Picher), 15 (diatomaceous earth from Manville) and 14 (base case) were subjected to a steam test to determine thermal stability. After 795, 810 and 840° C. steaming for six hours, all three catalysts showed similar surface retentions, as shown in FIG. 2. This suggests that neither diatomaceous earth material accelerates the thermal destruction of the catalyst.

EXAMPLES 3

Formulations 1 through 10 were each evaluated in a series of 10 test runs in an FCC mode microactivity test pilot plant (MAT). Reaction temperature was 485° C.. The feed to the MAT was a Kuwait vacuum gas oil having the composition set forth in the following Table 4:

TABLE 4

| | MAT FEED Kuwait VGO |
|---|---|
| API Gravity | 20.2 |
| Specific Gravity | 0.9328 |
| Aniline Point, °F. | 176. |
| Basic Nitrogen, wppm | 240. |
| Conradson Carbon, wt % | 0.5 |
| Composition, wt % | |
| Carbon | |
| Hydrogen | |
| Sulfur | 2.94 |
| Nitrogen | 0.0830 |
| Distillation | D-2887 |
| IBP | 590. |
| 5% | 664. |
| 10% | 698. |
| 20% | — |
| 30% | — |
| 40% | — |
| 50% | 839. |
| 60% | — |
| 70% | — |
| 80% | — |
| 90% | 981. |
| 95% | 1012. |
| FBP | 1081. |

The results of the test runs are set forth in the following Table 5.

TABLE 5

| | MAT RESULTS | | | | | | | | | |
|---|---|---|---|---|---|---|---|---|---|---|
| | Formulation and Run No. | | | | | | | | | |
| | 1 (0% DE) | 2 (10% DE) | 3 (10% DE) | 4 (25% DE) | 5 (25% DE) | 6 (25% DE) | 7 (0% DE) | 8 (10% DE) | 9 (25% DE) | 10 (50% DE) |
| FEED | KVGO | KVGO | KVGO | KVGO | KVGO | KVGO | KVGO | KVGO | KVGO | KVGO |
| W.H.S.V. | 36.170 | 36.150 | 36.150 | 36.090 | 36.030 | 36.150 | 36.170 | 36.170 | 36.170 | 36.170 |
| CAT/OIL | 3.980 | 3.980 | 3.980 | 3.990 | 4.000 | 3.980 | 3.980 | 3.980 | 3.980 | 3.980 |
| ASTM CONV | 62.800 | 63.100 | 60.100 | 69.200 | 67.500 | 61.600 | 65.300 | 68.300 | 66.800 | 60.100 |
| K | 21.700 | 65.500 | 55.900 | 85.700 | 79.100 | 60.600 | 68.800 | 78.500 | 75.600 | 56.200 |

TABLE 5-continued

| | MAT RESULTS | | | | | | | | | |
|---|---|---|---|---|---|---|---|---|---|---|
| | Formulation and Run No. | | | | | | | | | |
| | 1 (0% DE) | 2 (10% DE) | 3 (10% DE) | 4 (25% DE) | 5 (25% DE) | 6 (25% DE) | 7 (0% DE) | 8 (10% DE) | 9 (25% DE) | 10 (50% DE) |
| CONV WT % | 64.300 | 64.400 | 60.700 | 70.400 | 68.700 | 62.600 | 65.500 | 68.500 | 67.600 | 60.900 |
| MAT BAL. | 98.600 | 98.100 | 96.400 | 97.900 | 98.100 | 97.300 | 95.200 | 95.000 | 97.100 | 96.600 |
| $H_2$ | 0.030 | 0.033 | 0.028 | 0.018 | 0.032 | 0.018 | 0.013 | 0.023 | 0.016 | 0.012 |
| $C_1$ | 0.383 | 0.354 | 0.327 | 0.441 | 0.379 | 0.315 | 0.444 | 0.453 | 0.484 | 0.415 |
| $C_2 + C_2^=$ | 0.878 | 0.819 | 0.746 | 1.030 | 0.847 | 0.724 | 0.980 | 0.986 | 0.975 | 0.821 |
| $C_3$ | 0.630 | 0.572 | 0.482 | 0.711 | 0.585 | 0.509 | 0.896 | 0.877 | 0.922 | 0.638 |
| $C_3^=$ | 4.236 | 3.781 | 3.485 | 4.541 | 4.157 | 3.382 | 3.843 | 3.783 | 3.706 | 3.350 |
| $I-C_4$ | 2.948 | 2.486 | 1.887 | 3.355 | 2.986 | 2.580 | 3.654 | 3.671 | 3.505 | 2.641 |
| $N-C_4$ | 0.603 | 0.533 | 0.414 | 0.687 | 0.582 | 0.526 | 0.864 | 0.890 | 0.878 | 0.623 |
| $C_4^=$ | 5.973 | 5.606 | 5.143 | 6.153 | 5.897 | 4.764 | 4.621 | 4.460 | 4.139 | 4.027 |
| $C_5+$ IN GAS | 8.874 | 8.803 | 8.096 | 9.482 | 9.343 | 8.489 | 9.233 | 10.161 | 9.711 | 8.526 |
| $H_2 + C_1 + C_2 S$ | 1.291 | 1.206 | 1.101 | 1.490 | 1.259 | | | | | |
| $H_2 2 + C_1 + C_2 S$ | | | | | | 1.057 | 1.437 | 1.462 | 1.475 | 1.247 |
| $C_3 S + C_4 S$ | 14.390 | 12.976 | 11.410 | 15.447 | 14.207 | 11.761 | 13.878 | 13.680 | 13.150 | 11.279 |
| GAS | 15.700 | 14.200 | 12.500 | 16.900 | 15.500 | 12.800 | 15.300 | 15.200 | 14.600 | 12.500 |
| GASOLINE | 46.500 | 48.300 | 46.700 | 50.900 | 51.000 | 47.800 | 47.400 | 50.500 | 49.800 | 45.700 |
| L.C.O. | 19.400 | 19.600 | 21.700 | 18.400 | 18.400 | 20.200 | 20.100 | 19.200 | 18.600 | 19.300 |
| BOTTOMS | 16.400 | 16.000 | 17.600 | 11.200 | 12.900 | 17.200 | 14.400 | 12.400 | 13.800 | 19.900 |
| COKE ON F | 2.030 | 1.950 | 1.470 | 2.510 | 2.280 | 2.030 | 2.830 | 2.790 | 3.190 | 2.630 |
| SELECTIVITIES | | | | | | | | | | |
| GAS | 0.244 | 0.220 | 0.206 | 0.241 | 0.225 | 0.205 | 0.234 | 0.221 | 0.216 | 0.206 |
| GASOLINE | 0.724 | 0.749 | 0.770 | 0.723 | 0.742 | 0.763 | 0.723 | 0.738 | 0.736 | 0.751 |
| COKE | 0.032 | 0.030 | 0.024 | 0.036 | 0.033 | 0.032 | 0.043 | 0.041 | 0.047 | 0.043 |

It can be seen from the above MAT results that the catalysts with diatomaceous earth content perform better than the base cases, particularly from the standpoint of being able to achieve the most desirable balance between high gasoline production with low coke make.

EXAMPLE 4

A circulating pilot unit (CPU) was employed to test the catalyst composite of the instant invention and obtain comparative data with base line catalysts not containing diatomaceous earth. The CPU provides a very close simulation to commercial FCC units, including reactor and regenerator sections with catalyst circulated between them, and thus produces data which accurately represents what could be expected commercially. The CPU was operated at atmospheric pressure and a five-stage isothermal riser reactor was used at a reactor temperature of 510° C. and a feed rate of 10 g/min. The feedstock, a Four Corners vacuum gas oil, had the compositions set forth in the following Table 6:

TABLE 6

| | CPU FEED Four-Corners VGO |
|---|---|
| API Gravity | 25.0 |
| Specific Gravity | 0.9042 |
| Aniline Point, °F. | 194.5 |
| Basic Nitrogen, wppm | N/A |
| Conradson Carbon, wt % | 1.03 |
| Composition, wt % | |
| Carbon | |
| Hydrogen | |
| Sulfur | 0.46 |
| Nitrogen | 0.1083 |
| Distillation | D-1160 |
| IBP | 439. |
| 5% | 603. |
| 10% | 641. |
| 20% | — |
| 30% | — |
| 40% | — |
| 50% | 810. |
| 60% | 855. |
| 70% | 910. |
| 80% | 989. |

TABLE 6-continued

| | CPU FEED Four-Corners VGO |
|---|---|
| 90% | — |
| 95% | — |
| FBP | 1033. |

Catalyst formulations 11 (0% D.E.) and 12 (25% D.E.) from Example 1 were tested in the CPU and the products analyzed by gas chromatography (GC). The GC set of analyses are as set forth in the following Tables 7 and 8 which show the results of five test runs for each formulation:

TABLE 7

| CPU Results Based on GLC Analysis (Formulation 11 0% D.E.) | | | | | |
|---|---|---|---|---|---|
| Cat to Oil Ratio | 7.1 | 6.5 | 5.1 | 4.7 | 3.9 |
| Conversion, wt % | 78.50 | 76.00 | 72.13 | 71.58 | 69.52 |
| Coke Yield, wt % | 3.85 | 3.22 | 3.04 | 2.64 | 2.34 |
| Fuel Gas, wt % | 1.50 | 1.60 | 1.47 | 1.64 | 1.68 |
| LPG Yield, wt % | 17.79 | 17.48 | 15.98 | 15.65 | 14.46 |
| Gasoline, wt % | 55.36 | 53.71 | 51.64 | 51.64 | 51.04 |
| $C_{12}/C_{20}$, wt % | 12.54 | 13.86 | 14.90 | 14.73 | 15.31 |
| $C_{20+}$ Bottoms, wt % | 8.96 | 10.14 | 12.97 | 13.69 | 15.17 |

TABLE 8

| CPU Results Based on GLC Analysis (Formulation 12 25% D.E.) | | | | | |
|---|---|---|---|---|---|
| Cat to Oil Ratio | 7.6 | 7.1 | 6.0 | 4.7 | 4.1 |
| Conversion, wt % | 77.44 | 76.75 | 76.75 | 74.72 | 72.29 |
| Coke Yield, wt % | 3.91 | 3.97 | 3.19 | 3.55 | 2.34 |
| Fuel Gas, wt % | 1.41 | 1.37 | 1.33 | 1.38 | 1.26 |
| LPG Yield, wt % | 16.30 | 15.54 | 15.71 | 14.32 | 13.68 |
| Gasoline, wt % | 55.82 | 55.87 | 56.51 | 55.46 | 55.00 |
| $C_{12}/C_{20}$, wt % | 11.47 | 12.33 | 12.04 | 12.67 | 13.44 |
| $C_{20+}$ Bottoms, wt % | 11.08 | 10.92 | 11.21 | 12.61 | 14.27 |

Tables 7 and 8 clearly show significantly higher gasoline production, when using the diatomaceous earth containing catalyst of the present invention, without significant increase in coke make.

EXAMPLE 5

Figure 3:
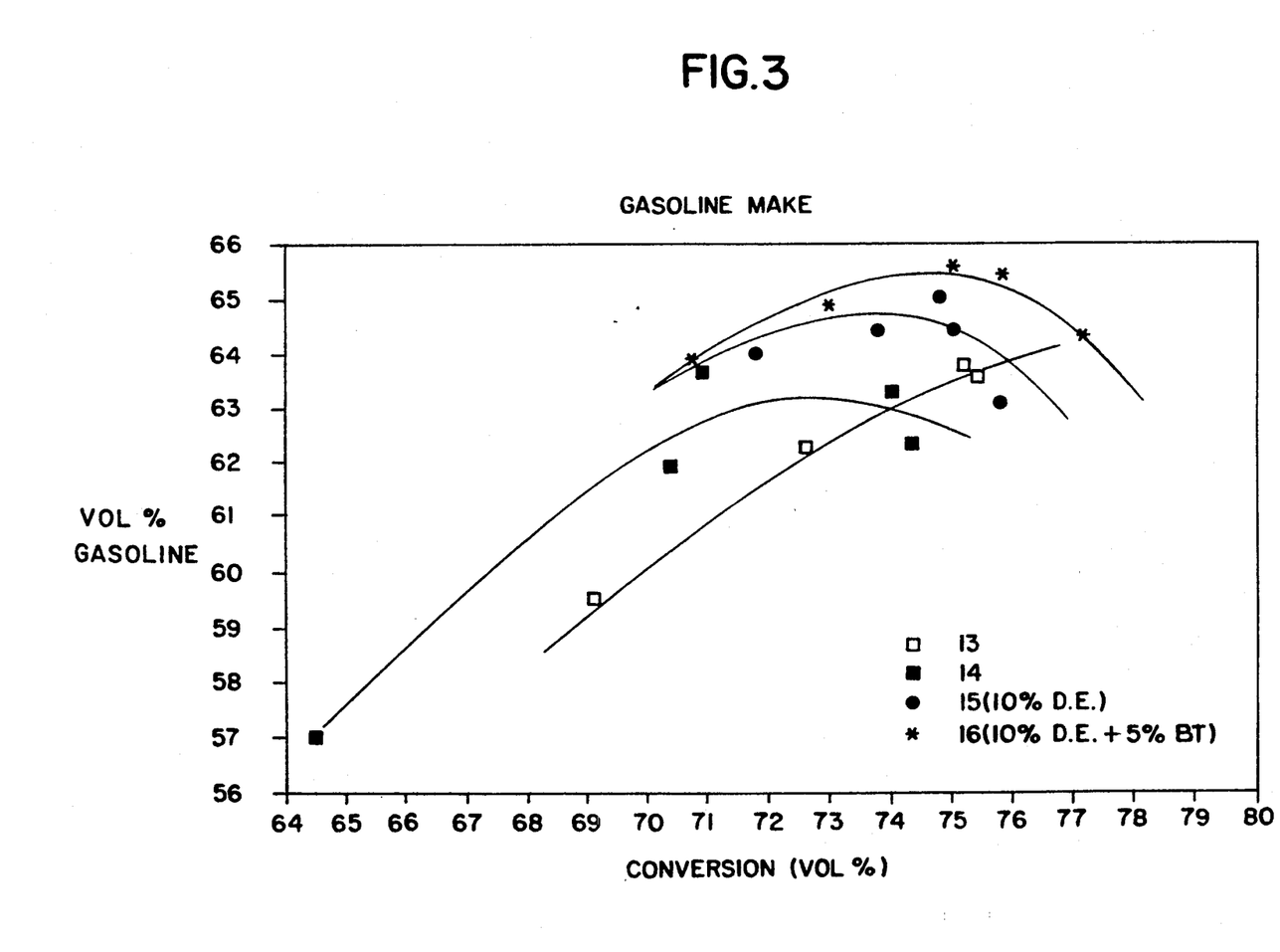
Figure 4:
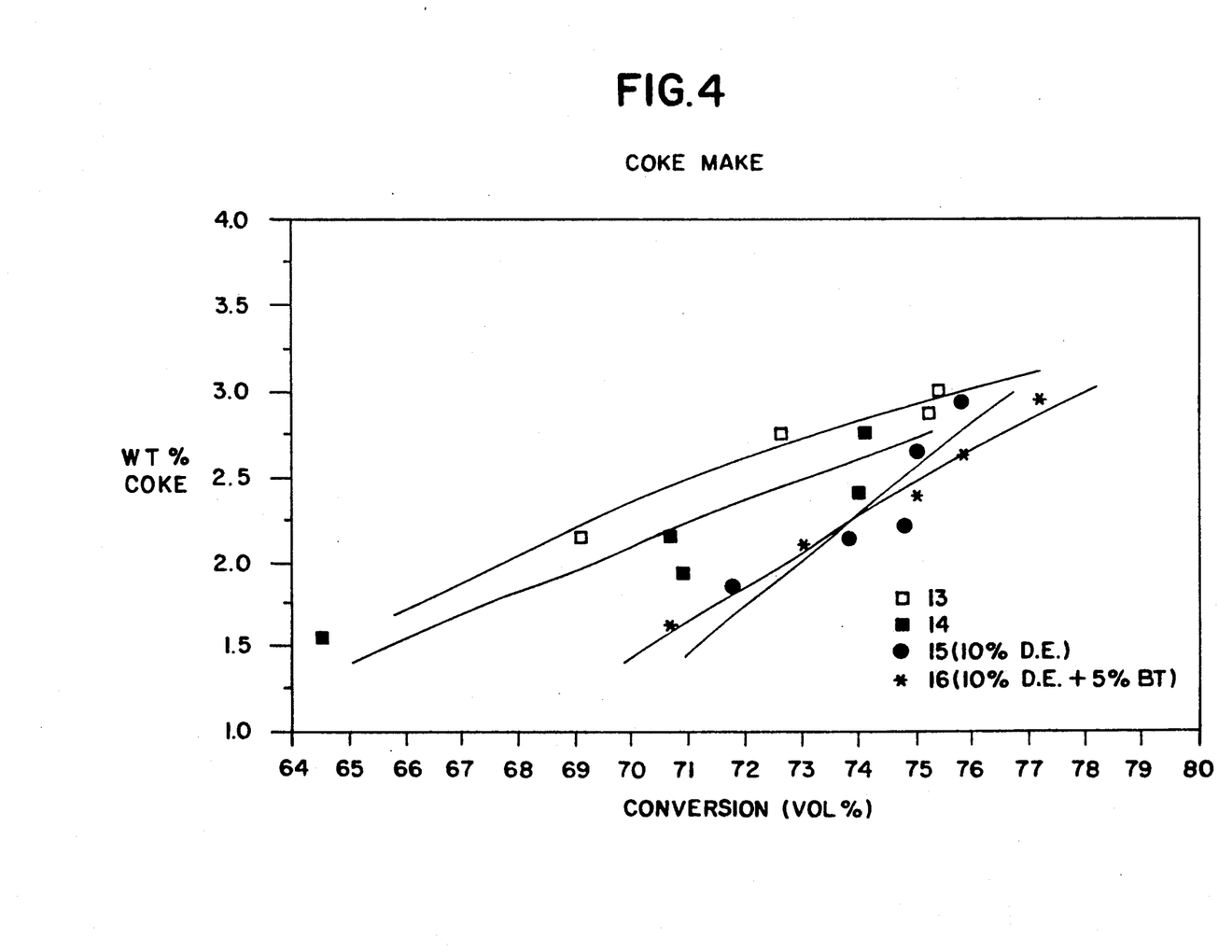

Formulations 13 through 16 from Example 1 were tested in the CPU precisely like Formulations 11 and 12, with the results tabulated and plotted on FIGS. 3 and 4 as gasoline production vs. conversion and coke production vs. conversion, respectively, as percentage of product. The results show a startling superiority of Formulations 15 and 16 of the present invention, which contain diatomaceous earth, at all practical conversion levels. The best of both worlds is achieved, maximizing gasoline make and minimizing coke make.

EXAMPLE 6

A linear multiple regression analysis was performed from the MAT data on seven catalysts, using Lotus 1-2-3 software whose computational method is based on the method given in Applied Regression Analysis by Draper and Smith, John Wiley & Sons, Inc., New York, 1966, p. 178. Any program capable of handling the linear multiple regressions would suffice.

Since all the catalysts have identical silica binder content, 24%, the binder and kaolin contents were not included in the analysis as variables. It is assumed that the each of the product or conversion value from MAT could be expressed in terms of the linear combination of the content of USY, rare earth oxide, alumina, and diatomaceous earth, such as Y wt % = $Coeff_1(MZ) + Coeff_2(RE) + Coeff_3(Al) + Coeff_4(DE) + Constant$ where Y is Conversion, Gasoline, LPG, LCO, Bottoms, or Coke, and MZ, RE, Al, and DE is the wt % of USY (ultrastable Y zeolite), rare earth oxide exchanged into USY, alumina, and diatomaceous earth respectively.

Coefficients 1 through 4 are referred to as X coefficients.

In this analysis, the Constant Parameter Model is used. The number of Observations, N, is 7, (7 catalysts or 7 MAT runs), and the number of Parameters including the constant is 5 (4, MZ, RE/MZ, Al, and DE). The Degrees of Freedom is N-P, 2, (7-5=2). The Standard Error of Y is calculated from $$\left[ \sum_{i=1}^{N} Wi(Yi - \hat{Yi})^2/(N - P) \right]^{\frac{1}{2}}$$

and R Squared from $$\left[ \sum_{i=1}^{N} Wi(\hat{Yi} - \overline{Y})^2/(P - 1) \right]^{\frac{1}{2}}$$

where Wi is the weight of the ith observation
$\hat{Y}$ is the predicted Yi value for the ith observation
$\overline{Y}$ is the weighted average of the observation From the following Regression Output Table generated from the MAT analysis and catalyst composition, the fact that the X Coefficient of DE in gasoline prediction is at least 10 times as large as the rest signifies that DE contributes most to the increase in gasoline yield and that there is a very strong positive correlation for the effect of DE on gasoline yield. In fact, there is a 0.52 wt % increase in gasoline for every 1% of DE incorporated in the catalyst formulation. Similarly, the DE contribution to LPG reduction is also the largest, as it is a negative number. There is a 0.25 wt % LPG reduced for every 1% DE incorporated.

| | MZ | RE/MZ | ALUMINA | DE | CONV | GASOLINE | LPG | LCO | BOTTOMS | COKE |
|---|---|---|---|---|---|---|---|---|---|---|
| | | | | | REGRESSION TABLE | | | | | |
| 1 | 38 | 2 | 10 | 3 | 70.4 | 51.3 | 13.9 | 19.7 | 9.9 | 3.5 |
| 2 | 40 | 2.5 | 0 | 0 | 66.1 | 49.2 | 13.4 | 21.8 | 12.1 | 2.2 |
| 3 | 32 | 4 | 10 | 0 | 68.3 | 49.4 | 13.5 | 20.3 | 11.5 | 3.6 |
| 4 | 22 | 10 | 20 | 5 | 73.5 | 51 | 14.3 | 18.6 | 7.9 | 5.5 |
| 4 | 35 | 2.5 | 5 | 5 | 68.7 | 52.1 | 12.6 | 20.6 | 10.7 | 3.3 |
| 6 | 22 | 10 | 10 | 5 | 68.1 | 52.6 | 10.9 | 22 | 10 | 3.3 |
| 7 | 35 | 4 | 15 | 0 | 75.7 | 50.3 | 18.3 | 16.1 | 8.2 | 5.1 |

Regression Output: CONVERSION

| | | | | |
|---|---|---|---|---|
| Constant | | | 41.93113 | |
| Std Err of Y Est | | | 1.986695 | |
| R Squared | | | 0.890020 | |
| No. of Observations | | | 7 | |
| Degrees of Freedom | | | 2 | |
| | MZ | RE | Al | DE |
| X Coefficient(s) | 0.575144 | 0.599697 | 0.635787 | 0.164168 |
| Std Err of Coef. | 0.536302 | 0.999231 | 0.164535 | 0.428748 |

Regression Output: GASOLINE

| | | | | |
|---|---|---|---|---|
| Constant | | | 48.10892 | |
| Std Err of Y Est | | | 0.606034 | |
| R Squared | | | 0.934112 | |
| No. of Observations | | | 7 | |
| Degrees of Freedom | | | 2 | |
| X Coefficient(s) | 0.031130 | 0.045199 | 0.031339 | 0.521584 |
| Std Err of Coef. | 0.167820 | 0.312681 | 0.051486 | 0.134164 |

Regression Output: LPG

| | |
|---|---|
| Constant | −6.39758 |
| Std Err of Y Est | 1.391421 |
| R Squared | 0.873448 |
| No. of Observations | 7 |
| Degrees of Freedom | 2 |

|  |  |  |  |  |
|---|---|---|---|---|
| X Coefficient(s) | 0.467664 | 0.473423 | 0.355741 | −0.25253 |
| Std Err of Coef. | 0.385307 | 0.717899 | 0.118211 | 0.308035 |

Regression Output:LCO

| | | |
|---|---|---|
| Constant | 32.27337 | |
| Std Err of Y Est | 1.257230 | |
| R Squared | 0.872705 | |
| No. of Observations | 7 | |
| Degrees of Freedom | 2 | |

|  |  |  |  |  |
|---|---|---|---|---|
| X Coefficient(s) | −0.25881 | −0.10626 | −0.37590 | 0.066291 |
| Std Err of Coef. | 0.348147 | 0.648663 | 0.106810 | 0.278327 |

Regression Output:BOTTOMS

| | | |
|---|---|---|
| Constant | 26.80532 | |
| Std Err of Y Est | 0.715579 | |
| R Squared | 0.030790 | |
| No. of Observations | 7 | |
| Degrees of Freedom | 2 | |

|  |  |  |  |  |
|---|---|---|---|---|
| X Coefficient(s) | −0.33947 | −0.52234 | −0.26540 | −0.24643 |
| Std Err of Coef. | 0.198155 | 0.369200 | 0.060793 | 0.158416 |

Regression Output:COKE

| | | |
|---|---|---|
| Constant | 0.288149 | |
| Std Err of Y Est | 0.507480 | |
| R Squared | 0.933697 | |
| No. of Observations | 7 | |
| Degrees of Freedom | 2 | |

|  |  |  |  |  |
|---|---|---|---|---|
| X Coefficient(s) | 0.044974 | 0.020276 | 0.192411 | 0.012787 |
| Std Err of Coef. | 0.140529 | 0.261832 | 0.043114 | 0.112346 |

MULTIPLE REGRESSION ANALYSIS

PREDICTION OF YIELDS

| NO. | MZ | RE/MZ | ALUMINA | DE | CONVERSION EXPERIM | CALCUL |
|---|---|---|---|---|---|---|
| 1 | 38 | 2 | 10 | 3 | 70.4 | 71.8 |
| 2 | 40 | 2.5 | 0 | 0 | 66.1 | 66.4 |
| 3 | 32 | 4 | 10 | 0 | 68.3 | 69.1 |
| 4 | 22 | 10 | 20 | 5 | 73.5 | 74.1 |
| 5 | 35 | 2.5 | 5 | 5 | 68.7 | 67.6 |
| 6 | 22 | 10 | 10 | 5 | 68.1 | 67.8 |
| 7 | 35 | 4 | 15 | 0 | 75.7 | 74.0 |

Regression Output: CONVERSION

| | | | | |
|---|---|---|---|---|
| Constant | 41.93113 | | | |
| Std Err of Y Est | 1.936695 | | | |
| R Squared | 0.890020 | | | |
| No. of Observations | 7 | | | |
| Degrees of Freedom | 2 | | | |
| X Coefficient(s) | 0.575144 | 0.599697 | 0.635787 | 0.164168 |
| Std Err of Coef. | 0.536302 | 0.999231 | 0.164535 | 0.428748 |

| NO. | GASOLINE EXPERIM | CALCUL |
|---|---|---|
| 1 | 51.3 | 51.3 |
| 2 | 49.2 | 49.5 |
| 3 | 49.4 | 49.6 |
| 4 | 52 | 52.5 |
| 5 | 52.1 | 52.1 |
| 6 | 52.6 | 52.2 |
| 7 | 50.3 | 49.8 |

Regression Output:GASOLINE

| | | | | |
|---|---|---|---|---|
| Constant | 48.10892 | | | |
| Std Err of Y Est | 0.606034 | | | |
| R Squared | 0.934112 | | | |
| No. of Observations | 7 | | | |
| Degrees of Freedom | 2 | | | |
| X Coefficient(s) | 0.031130 | 0.045199 | 0.031339 | 0.521584 |
| Std Err of Coef. | 0.167820 | 0.312681 | 0.051486 | 0.134164 |

| NO. | LPG EXPERIM | CALCUL |
|---|---|---|
| 1 | 13.9 | 15.1 |
| 2 | 13.4 | 13.5 |
| 3 | 13.5 | 14.0 |
| 4 | 14.3 | 14.5 |
| 5 | 12.9 | 11.7 |
| 6 | 10.9 | 10.9 |
| 7 | 18.3 | 17.2 |

Regression Output:LPG

| | | | | |
|---|---|---|---|---|
| Constant | −6.39758 | | | |
| Std Err of Y Est | 1.391421 | | | |
| R Squared | 0.873448 | | | |
| No. of Observations | 7 | | | |
| Degrees of Freedom | 2 | | | |
| X Coefficient(s) | 0.467664 | 0.473423 | 0.355741 | −0.25253 |
| Std Err of Coef. | 0.385307 | 0.717899 | 0.118211 | 0.308035 |

The following calculations were made based on the linear equations derived from the multiple regression analysis as described above.

| GASOLINE COEFF | CONVERSION COEFF | COMPO- NENT | AMOUNT | | | |
|---|---|---|---|---|---|---|
| 0.03113 | 0.5751 | ZEOLITE | 38 | 38 | 38 | 38 |
| 0.0452 | 0.5997 | RARE EARTH | 2 | 2 | 2 | 2 |
| 0.03133 | 0.6358 | ALUMINA | 10 | 10 | 10 | 10 |
| 0.5216 | 0.1642 | DE | 0 | 1 | 2 | 3 |
| DE % | | | 0 | 1 | 2 | 3 |
| CALCULATED GASOLINE | 49.69554 | 50.21714 | 50.73874 | | 51.26034 | |
| CALCULATED CONVERSION | 71.3423 | 71.5065 | 71.6707 | | 71.8349 | |

From the above calculations it can be seen that diatomaceous earth content as low as 1 wt % will produce very positive results with regard to gasoline yield.

I claim as my invention:

1. A catalytic composite suitable for the fluidized catalytic cracking of hydrocarbons in the absence of added hydrogen comprising particles containing a binder material comprising at least one inorganic refractory metal oxide selected from the group consisting of alumina, silica, zirconia, boria, magnesia, titania and chromia, a crystalline aluminosilicate and from about 1 wt % to about 15 wt % diatomaceous earth dispersed throughout the binder material as particles having a particle size of from about 2 to about 5 microns, but not including a supported catalytically active metal or metal oxide.

2. The catalytic composite of claim 1 wherein said composite contains from about 20 to about 30 wt % kaolin.

3. The catalytic composite of claim 1 wherein the composite contains up to about 10 wt % barium titanate.

4. The catalytic composite of claim 1 wherein the apparent bulk density of the composite is from about 0.65 to about 0.80 g/cc.

5. The catalytic composite of claim 1 wherein the composite contains from about 10 to about 30 wt % of said binder material.

6. The catalytic composite of claim 1 wherein said crystalline aluminosilicate comprises a Y-zeolite forming from about 20 to about 40 wt % of said composite.

7. The catalytic composite of claim 1 wherein said composite contains up to about 20 wt % discrete particles of porous alumina.

8. The catalytic composition of claim 1 wherein said composite contains from up to about 3 wt % rare earth metal, based on the oxide.

9. A process for cracking a hydrocarbon charge stock in the absence of added hydrogen which comprises contacting said charge stock at cracking conditions with a catalytic composite comprising at least one inorganic refractory metal oxide selected from the group consisting of alumina, silica, zirconia, boria, magnesia, titania and chromia, a crystalline aluminosilicate and from about 1 wt % to about 15 wt % diatomaceous earth dispersed throughout the binder material as particles having a particle size of from about 2 to about 5 microns, but not including a supported catalytically active metal or metal oxide.

10. The process of claim 9 wherein said composite contains from about 20 to about 30 wt % kaolin.

11. The process of claim 9 wherein the composite contains up to about 10 wt % barium titanate.

12. The process of claim 9 wherein the apparent bulk density of the composite is from about 0.65 to about 0.80 g/cc.

13. The process of claim 9 wherein the composite contains from about 10 to about 30 wt % of said binder material.

14. The process of claim 9 wherein said crystalline aluminosilicate comprises a Y-zeolite comprising from about 20 to about 40 wt % of said composite.

15. The process of claim 9 wherein said composite contains up to about 20 wt % discrete particles of porous alumina.

16. The process of claim 9 wherein said composite contains up to about 3 wt % rare earth metal, based on the oxide.

17. A process for preparing a catalyst composite suitable for the fluidized catalytic cracking of hydrocarbons in the absence of added hydrogen and comprising at least one inorganic refractory metal oxide, a crystalline aluminosilicate and diatomaceous earth, comprising the following steps:
  (a) preparing a binder precursor solution (I) comprising an aqueous acidic solution of at least one inorganic metal oxide selected from the group consisting of alumina, silica, zirconia, boria, magnesia, titania and chromia and chilling to less than about 20° C. (II);
  (b) adding to the solution (II) a sufficient amount of diatomaceous earth to produce a concentration of from about 1 to about 15 weight percent in the finished catalyst, forming a slurry (IV);
  (c) preparing separate acidic slurries (III) of at least one crystalline aluminosilicate and at least one inorganic metal oxide selected from the above group and adding both slurries to slurry (IV) to form slurry (VI);
  (d) mixing said slurry (VI), maintaining the temperature at less than about 20° C. and the pH at least than about 4;
  (e) spray drying said slurry (VI) to form particles of crude catalyst; and
  (f) washing and drying said particles of crude catalyst to recover a catalyst product containing from about 1 to about 15 weight percent of diatomaceous earth particles having a particle size of from about 2 to about 5 microns.

18. The process of claim 17 wherein at least one optional ingredient selected from kaolin and barium titanate is added to said slurry (IV) before combining slurry (IV) with said slurries (III).

19. The process of claim 17 wherein said crystalline aluminosilicate is ion exchanged with at least one of ammonium and rare earth cations prior to addition to said slurry (III).

20. The process of claim 17 wherein discrete particles of porous alumina are added to said binder solution (II).

21. The catalyst composite produced by the process of claim 17.

22. The catalytic composite of claim 1 which has a Davidson Attrition Index of less than about 7.

23. A catalytic composite suitable for the fluidized catalytic cracking of hydrocarbons in the absence of added hydrogen comprising particles containing a binder material comprising at least one inorganic refractory metal oxide selected from the group consisting of alumina, silica, zirconia, boria, magnesia, titania and chromia, a crystalline aluminosilicate, from about 20 to about 20 wt % kaolin, up to about 10 wt % barium titanate and from about 1 wt % to about 15 wt % diatomaceous earth dispersed throughout the binder material as particles having a particle size of from about 2 to about 5 microns, but not including a supported catalytically active metal or metal oxide.

* * * * *